Nov. 26, 1935.  G. B. WATKINS  2,022,484
APPARATUS FOR PRODUCING LAMINATED GLASS
Filed May 21, 1930  3 Sheets-Sheet 1
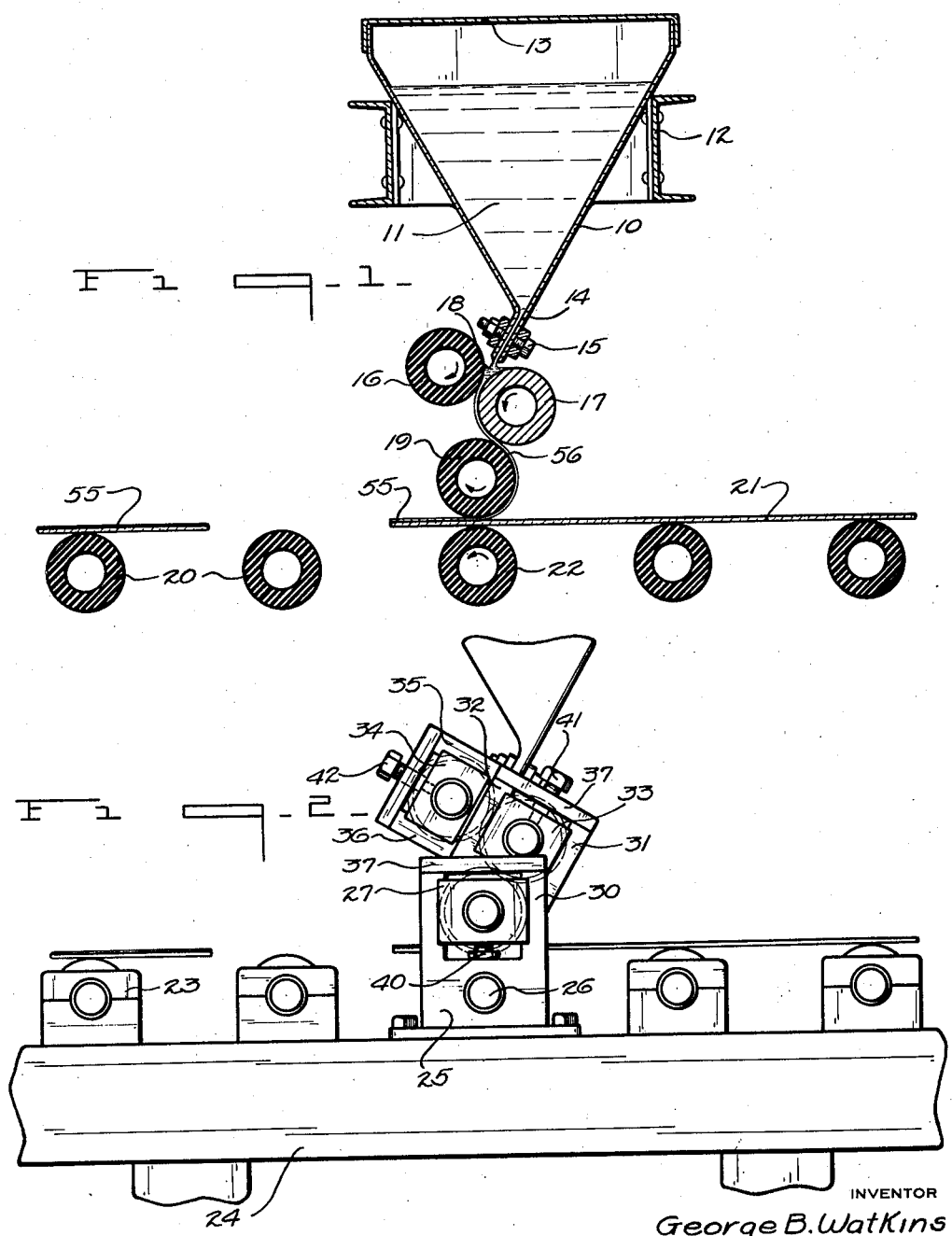
INVENTOR
George B. Watkins
BY
Frank Fraser
ATTORNEY

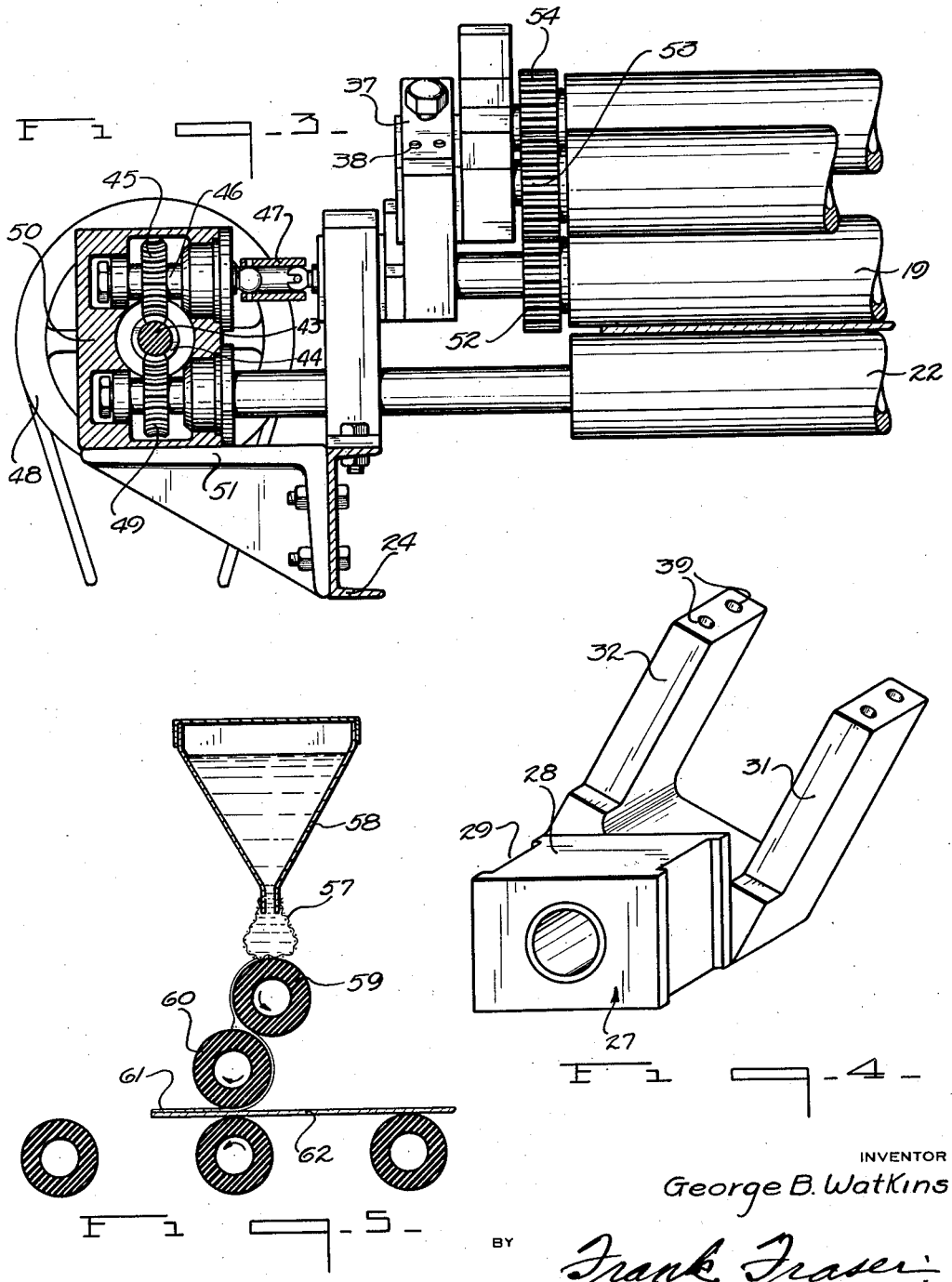

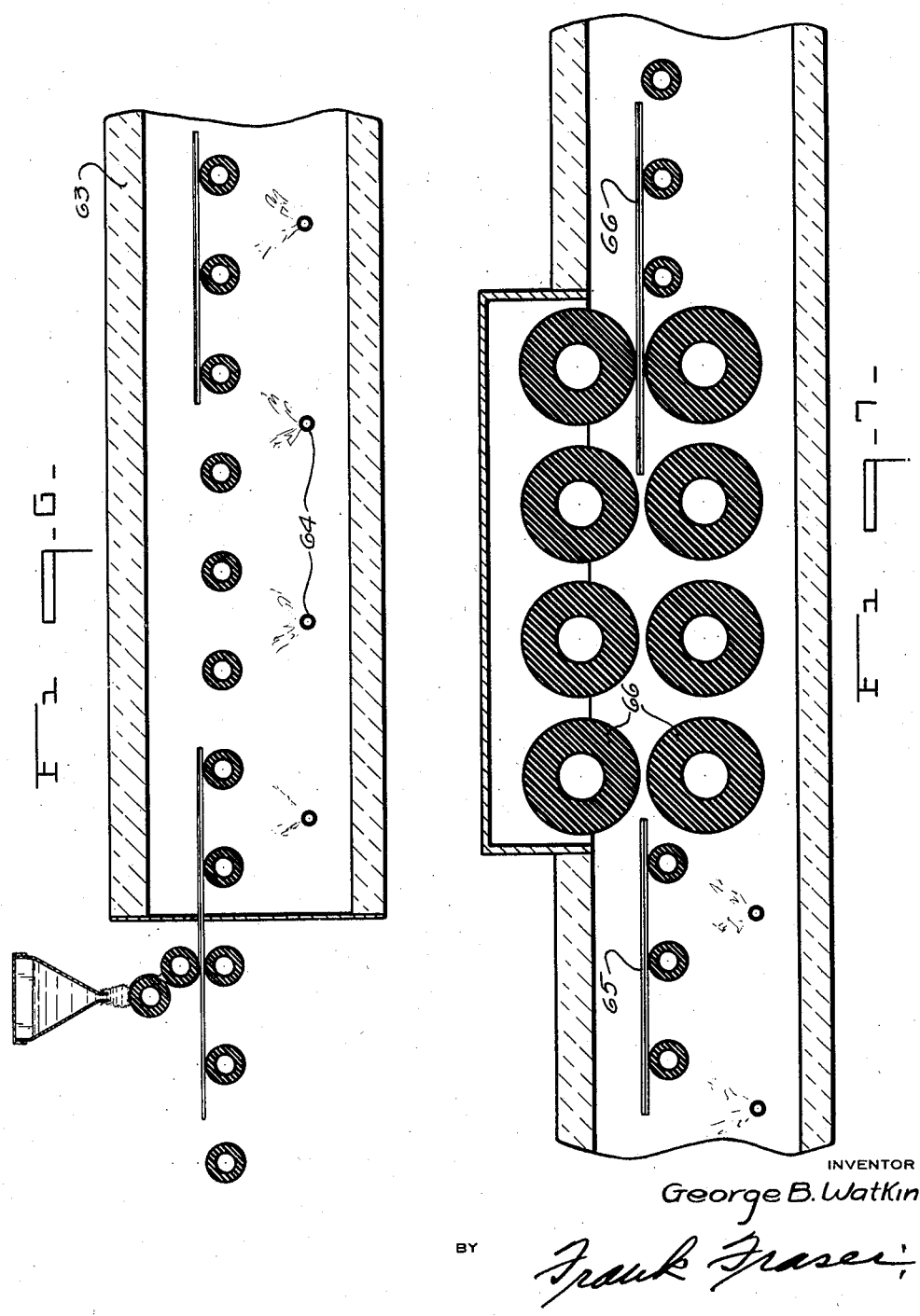

Patented Nov. 26, 1935

2,022,484

UNITED STATES PATENT OFFICE 2,022,484

APPARATUS FOR PRODUCING LAMINATED GLASS

George B. Watkins, Toledo, Ohio, assignor to Libbey-Owens-Ford Glass Company, Toledo, Ohio, a corporation of Ohio Application May 21, 1930, Serial No. 454,265

5 Claims. (Cl. 91—49)

The present invention relates to apparatus for use in the manufacture of laminated glass and more particularly to an apparatus designed for the coating of sheets with an adhesive or other bond inducing medium.

The expression "laminated glass" is used to designate a composite structure ordinarily comprising two sheets of glass with an interposed non-brittle membrane, the three laminations being bonded together. One of the main problems encountered in the production of such glass is the bonding together of the laminations which includes the application of the adhesive or other bond inducing medium. To get the most satisfactory results, the application of such bond inducing medium should be relatively uniform. Further, it is quite important in most instances that the bond inducing medium be spread entirely over the laminations to insure that the laminations will be bonded together throughout their entire areas after subjected to the necessary or desired heat and pressure.

In the past, laminated glass has been made by dipping or brushing the adhesive or other bond inducing medium upon one or more of the laminations. More recently, I have developed the spraying of such medium upon one or more of the laminations.

The present application sets forth an apparatus designed for the coating of the glass as distinguished from dipping and spraying.

With some processes of producing laminated glass dipping is not satisfactory for numerous reasons which need not be gone into detail here. Further, with some mixtures or adhesives, it is either impossible or decidedly difficult to properly spray the same on the laminations with ordinary equipment because of viscosity, etc.

To provide an apparatus capable of applying a uniform deposit of the bond inducing medium onto the laminations in a quick, accurate, and economical manner, I have developed the present invention.

It is therefore one of the objects of this invention to provide an apparatus that can be used successfully with practically all bond inducing mediums or other agents that may be used in the manufacture of laminated glass in an accurate, rapid, and economical manner.

Other objects and advantages of the invention will become more apparent during the course of the following description when taken in connection with the accompanying drawings.

In the drawings wherein like numerals are employed to designate like parts throughout the same, Fig. 1 is a diagrammatic vertical longitudinal section through one form of apparatus that may be employed, Fig. 2 is a side elevation of such apparatus, Fig. 3 is an enlarged detail of a portion thereof, partly in section, Fig. 4 is a detail in perspective of a portion of the mounting mechanism, Fig. 5 is a diagrammatic vertical longitudinal section through a modified form of apparatus, Fig. 6 illustrates the apparatus of Fig. 5 in combination with a drying chamber, and Fig. 7 is a diagrammatic showing of a pressing means that may be employed to press the laminations together after they have been suitably treated.

Referring to Fig. 1, the numeral 10 designates a hopper or other container adapted to contain a quantity of adhesive or other bond inducing medium 11 adapted to be used in the manufacture of laminated glass. As shown, the hopper 10 is carried by the support 12 and is provided with a removable cover 13. Temperature controlling means may be associated with the hopper if desired, whereby to control the temperature of the bath of material 11, although such means are not illustrated in the drawings as their use will be readily understood.

Arranged at or near the bottom of the container 10 is an outlet spout 14 formed by the spaced lips, the gap between which is adjusted by means of the bolts or other mechanism 15.

Positioned beneath the discharge outlet 14 is a pair of rolls 16 and 17, and as shown in Fig. 1, the rolls are so mounted that a slight building up of the material takes place at 18. Also associated with the roll 17 is a third roll 19. I have found from actual experience that the combination of rubber and metallic rolls works out extremely satisfactorily in the deposition of the material upon the laminations. As shown, a series of rolls 20 constitute a conveyor upon which glass sheets 21 may be passed under the coating mechanism just described. One of the rolls, namely the roll 22, is preferably mounted in opposition to the roll 19.

The rolls 16, 17, and 19 are mounted for adjustment and for positive rotation. Referring to Figs. 2, 3, and 4, it will be seen that the rolls 20 are mounted in the journals 23 carried on the support 24. Also carried on the support 24 is an upstanding bracket 25 in which is mounted the shaft 26 of the roll 22 and also a sliding bearing 27. The perspective illustrated in Fig. 4 clearly shows the slidable bearing 27. The bearing constitutes a block portion 28 provided with channels 29 in which are adapted to be received the upstanding arms 30 of the bracket 25. Also carried by the block 28 is a pair of spaced arms 31 and 32 similar to the upstanding portions 30 of the support 25. It is preferred that the arms 31 and 32 be offset as illustrated, and they constitute in turn arms adapted to receive a second adjustable bearing block 33 disclosed in Fig. 2, which bearing block is similar in construction to the one illustrated in Fig. 4 so that a third bearing block 34 is carried by the arms 35 and 36. Removable cap plates 37 are used to hold the blocks 28 in position between the arms above described. These cap plates are held in place by means of the screws or the like 38 receivable in the threaded openings 39 formed in the ends of the arms.

Associated with the block 27 is an adjusting bolt 40. Likewise, an adjusting screw 41 is associated with the block 33, while a bolt 42 is used to control the position of the adjustable block 34. The block 27 rotatably supports the roll 19, the block 33 rotatably supports the roll 17, and the roll 16 is rotatably carried in the block 34.

The shaft of the roll 19 is preferably connected to a driving shaft 43 through the worm 44 keyed to the shaft, gear 45 carried on the transversely mounted shaft 46 through means of the universal coupling 47. A driving wheel 48 is associated with the shaft 43 whereby to positively drive the shaft and associated parts when desired. The lower roll 22 may also be connected to the shaft 43 by means of the gear 49. The housing 50 for the gears, bearings, etc., may be placed upon the bracket 51 carried by the frame 24. The roll shaft 19 carries a pinion 52 meshing with a gear 53 carried by the roll shaft of roll 17, which in turn meshes with the pinion 54 associated with the roll 16. Upon positive rotation of the shaft 46, therefore, it will be seen that the rolls will be driven in the direction indicated by the arrows in Fig. 1.

It will be noted that the roll 19 is placed in opposition to the roll 22, and by proper adjustment of the blocks 27 carrying the rolls, the space between said rolls 19 and 22 can be determined. I have actually found that the most satisfactory results are obtained when the outer surface of the roll 19, adapted to contact with the sheet passing thereunder, is perfectly cylindrical. It is also preferred that the outer surface at least of the roll be formed from a relatively flexible rubber material or equivalent thereof so that this roll can be placed into quite intimate contact with the glass without injury thereto. It is also preferred that the rolls 16 and 17 be cylindrical and that the roll 17 which contacts with both of the rolls 16 and 19 be provided with an outer metallic surface.

To produce a coating or film of material on the glass, the discharge spout 14 is adjusted to give the proper flow of material which may be allowed to accumulate if desired, or not, in the pocket formed between the rolls 16 and 17. The rolls are positively driven and when they have been coated with the material, due to the fact that the rolls contact with one another as described, the sheet of glass is then passed on the conveyor between the rolls 19 and 22. When the proper adjustment between the rolls is had, the roll 19 will deposit a uniform film 55 on the glass 21. While the rolls are shown for the sake of clearness in spaced relation with a film 56 passing therebetween, in actual practice, the rolls are quite closely pressed together so that there is no apparent gap between the rolls. Furthermore, the action of the rolls is such that a sheet of material, such as shown, does not ordinarily flow as illustrated because the entire surface of the rolls is coated with the material and one roll coats the next succeeding roll therewith. However, for the purposes of illustration, this close contact and complete coverage of the rolls is not shown. By controlling the pressure between the various rolls, the pressure between the roll 19 and glass, and the speed of rotation thereof, the amount of material deposited is easily and accurately controlled. Best results are obtained when the peripheral speed of the roll 19 is identical with the lineal travel of the sheet thereunder. It is preferred that the width of the discharge slot 14 of the receptacle 10 be substantially the width of the rolls and obviously, the length of the rolls should at least be the same as the width of the sheet to be coated.

In Figs. 5 and 6, modified constructions are shown, wherein instead of the valve controlled outlet 14, a fabric wiper 57 is carried by the end of the receptacle 58 and is adapted to rub against the uppermost roll 59. By controlling the pressure of this wiper against the roll 59, the amount of the material deposited upon said roll can be controlled. The roll 59 is adapted to contact with the roll 60, which in turn deposits the film 61 upon the glass 62. While glass can be coated by using rubber rolls as shown in Fig. 5, nevertheless I consider it to be much more desirable to use the combination of rubber and metallic rolls because of the more uniform distribution of coating on the glass surface.

In some instances, it may be necessary to dry or otherwise treat the coating of material placed upon the glass, and therefore in Fig. 6, a tunnel structure 63 is provided for the reception of the glass after it has been coated. The conveyor placed under the receptacle can be extended into and through the tunnel structure, and temperature controlling means or other elements 64 can be arranged therein for the proper treatment or control of the coating.

In Fig. 7 is disclosed a form of pressing means by which coated laminations can be pressed together. Further, this pressing chamber may be a continuation of the structure 63, although in such case, provision should be made to allow for the placing of one sheet upon another to create a sandwich. At this time an additional sheet of plastic material may be interposed between the coated glass surfaces if desired. Such a sandwich 65 is illustrated, and as shown, it is being passed along on the conveyor toward the pressing rolls 66 so designed to exert the desired pressure upon the sandwich. The temperature of the compartment in which the pressing rolls are arranged can be controlled to give the desired action. These rolls may be used to give the final composite sheet or they may serve to give a preliminary pressing so that the sheet 66, which has been pressed, can be placed into an autoclave or other pressing apparatus and there subjected to finishing pressures and temperatures to give the finished composite sheet.

With the apparatus illustrated in the drawings and particularly that illustrated in Figs. 1, 2, 3, and 4, it is possible to quickly, accurately, and economically coat sheets of glass with adhesive or other bond inducing medium utilized in the manufacture of laminated glass. In addition, dirt hazard quite frequently encountered is reduced to a minimum and to this end, any suitable hoods or the like can be arranged over the glass as it is being passed to and from the coating machine. Obviously, prior to the passage of the glass through the coating apparatus, it has been previously cleaned as will be readily understood.

I claim:

1. Apparatus of the character described for applying a bond-inducing medium to sheets for use in the manufacture of laminated glass, including a cylindrical roll adapted to carry a film of bond-inducing medium, a second roll for supplying the bond-inducing medium to said first roll, means for moving a sheet in contact with the first-mentioned roll to coat the same, means for moving said rolls bodily vertically as a unit to control the pressure between the first-named roll and the sheet passing in contact therewith without changing the position of the rolls relative to one another, and separate means for moving said second-mentioned roll toward and away from said first-mentioned roll.

2. Apparatus of the character described for applying a bond-inducing medium to sheets for use in the manufacture of laminated glass, including a supply hopper, a pair of rolls positioned beneath the discharge outlet thereof, a third roll mounted for rotatable contact with one of the rolls of said pair, means for rotating all of said rolls whereby the third roll will be provided with a film of bond-inducing medium, means for passing a sheet in contact with said third roll in a manner that said sheet will be coated with a substantially uniform deposit of bond-inducing medium, means for moving all of said rolls bodily vertically as a unit to control the pressure between the third roll and sheet passing in contact therewith without changing the position of the rolls relative to one another, and means for moving the individual rolls toward and away from one another to control the pressure therebetween without varying the position of said third-mentioned roll relative to said sheet.

3. Apparatus of the character described for applying a bond-inducing medium to sheets for use in the manufacture of laminated glass, including a cylindrical roll adapted to carry a film of bond-inducing medium, a second roll for supplying the bond-inducing medium to said first roll, means for moving a sheet in contact with the first-mentioned roll to coat the same, vertically movable bearing blocks for rotatably supporting the first roll, means carried by said bearing blocks for rotatably supporting said second roll, means engaging the bearing blocks to move the rolls bodily vertically as a unit to control the pressure between the first-named roll and sheet passing in contact therewith without changing the position of the rolls relative to one another, and separate means for moving said second-mentioned roll toward and away from said first-mentioned roll.

4. Apparatus of the character described for applying a bond-inducing medium to sheets for use in the manufacture of laminated glass, including a supply hopper, a pair of rolls positioned beneath the discharge outlet thereof, a third roll mounted for rotatable contact with one of the rolls of said pair, means for rotating all of said rolls whereby the third roll will be provided with a film of bond-inducing medium, means for passing a sheet in contact with said third roll in a manner that said sheet will be coated with a substantially uniform deposit of bond-inducing medium, vertically movable bearing blocks for rotatably supporting said third roll, means carried by said bearing blocks for rotatably supporting said pair of rolls, means engaging the bearing blocks to move all of the rolls bodily vertically as a unit to control the pressure between the third roll and sheet passing in contact therewith without changing the position of the rolls relative to one another, and means for moving the individual rolls toward and away from one another to control the pressure therebetween without varying the position of the third roll relative to the sheet.

5. Apparatus of the character described for applying a bond-inducing medium to sheets for use in the manufacture of laminated glass, including a cylindrical roll adapted to carry a film of bond-inducing medium, a second roll for supplying the bond-inducing medium to said first roll, a third roll mounted for rotatable contact with said second roll, means for feeding a supply of the bond-inducing medium between the second and third mentioned rolls, means for passing a sheet in contact with said first-mentioned roll in a manner that said sheet will be coated with a substantially uniform deposit of bond-inducing medium, vertically movable bearing blocks for rotatably supporting the first roll, a pair of spaced arms carried by each bearing block and being offset with respect thereto, bearing blocks slidably received between said arms and adapted to rotatably support the second roll, said last-mentioned bearing blocks being also provided with spaced arms offset with respect thereto, bearing blocks slidably received between said last-mentioned arms and adapted to rotatably support the third roll, means engaging the first-mentioned bearing blocks to move the three rolls bodily vertically as a unit to control the pressure between the first-named roll and the sheet passing in contact therewith without changing the position of the rolls relative to one another, means engaging the second-mentioned bearing blocks for moving said second roll toward and away from the first roll, and means engaging the third-mentioned bearing blocks for moving said third roll toward and away from said second roll.

GEORGE B. WATKINS.